United States Patent [19]

Hosoya

[11] Patent Number: 5,058,987
[45] Date of Patent: Oct. 22, 1991

[54] COATED OPTICAL FIBER

[75] Inventor: Toshifumi Hosoya, Yokohama, Japan

[73] Assignee: Sumitomo Electric Industries, Ltd., Osaka, Japan

[21] Appl. No.: 543,958

[22] Filed: Jun. 27, 1990

[30] Foreign Application Priority Data

Jun. 28, 1989 [JP] Japan ................................. 1-163824

[51] Int. Cl.⁵ .............................................. G02B 6/16
[52] U.S. Cl. .................................. 385/128; 385/124; 385/141
[58] Field of Search .... 350/96.23, 96.29, 96.30–96.34; 427/163

[56] References Cited

U.S. PATENT DOCUMENTS

| 4,344,669 | 8/1982 | Uchida et al. | 350/96.30 |
| 4,410,567 | 10/1983 | France et al. | 427/163 |
| 4,482,204 | 11/1984 | Blyler, Jr. et al. | 350/96.34 |
| 4,511,209 | 4/1985 | Skutnik | 350/96.34 |
| 4,756,600 | 7/1988 | Ramsay et al. | 350/96.30 |
| 4,848,869 | 7/1989 | Urruti | 350/96.33 |
| 4,875,758 | 10/1989 | Masuda et al. | 350/96.30 |
| 4,877,306 | 10/1989 | Kar | 350/96.33 |

OTHER PUBLICATIONS

S. Yamakawa et al, "New Zero Linear Expansion Coefficient Tight Jacket Optical Fiber", Optical Communication, Oct. 1983, pp. 227–230.
Nobuyuki Yoshizawa, "Optical Fiber Core", Pat. Abstracts of Japan, Sept. 1984, vol. 8, No. 208 (p.302)(1645).
S. Tanaka et al, "Characteristics of Nylon Jacketed Fibre with Compressive Strain", Optical Comm., Sept. 1982, pp. 250–255.
M. H. Reeve et al, "Influence of the Nylon and Process Parameter . . . ", Optical Comm., Oct. 1983, pp. 373–376.
Akira et al., "Ultraviolet-curable compositions . . . ", Chemical Abstract, Sept. 1988, p. 287.
Sakata et al, "Coating of Glass or Ceramic . . . ", Chemical Abstracts, Jun. 1987, p. 293.

Primary Examiner—John D. Lee
Attorney, Agent, or Firm—Cushman, Darby & Cushman

[57] ABSTRACT

An optical fiber comprising a glass optical fiber and a rigid protective layer which is coated directly on the glass fiber wherein a constricting force F generated by the protective layer is from −0.05 kg to +0.05 kg when the force F is defined by the following equation:

$$F = \text{(Cross sectional area of protective layer)} \times \text{(Young's modulus of protective layer)} \times \text{(Shrinkage factor of inner diameter of protective layer),}$$

which has improved transmission performances.

5 Claims, 3 Drawing Sheets

COATED OPTICAL FIBER

BACKGROUND OF THE INVENTION

1. Field of the Invention

The present invention relates to a coated optical fiber for telecommunication having improved transmission performances.

2. Description of the Related Art

An optical fiber as drawn has some drawbacks such as insufficient mechanical strength and poor maintenance of transmission characteristics. Therefore, the drawn optical fiber is coated with, for example, a resin. In general, the optical fiber has one or two coating layers. FIG. 1 shows a cross section of an optical fiber having a two-layer coating comprising a soft cushioning layer 2 which is coated around a glass optical fiber 1 and a rigid protective layer 3 surrounding the cushioning layer 2.

FIG. 2 shows a cross section of an optical fiber having a single protective layer 3. An example of this type optical fiber is an optical fiber which is coated with a UV curable resin and used in a submarine cable which requires large strength. Recently, as techniques for increasing the strength and improving heat resistance of the optical fiber are developed, highly heat resistant resins with large Young's modulus such as ladder type silicone resins or polyimide resins are used to form the protective layer.

When the resin is coated on the optical fiber as drawn, a volume of the coating layer decreases as the coated resin is cured irrespective of the UV curable resin or thermosetting resins such as ladder type silicone resins. The volume decrease of the coated layer starts at a moment when the resin is changed from a liquid state to the solid state by heating or irradiation. That is, the volume decrease starts and finishes as soon as the resin curing starts. When the volume decrease of the coated layer compresses or expands the glass fiber in a radius direction of the fiber with large force, the glass fiber is strained, so that light transmission loss at room temperature increases. Since the increase of transmission loss is significant when the protective layer 3 is directly formed on the glass fiber or it has large Young's modulus, prevention of the increase of transmission loss of the coated layer is one of the problems to be solved for increasing the strength of the optical fiber.

To prevent the increase of transmission loss, various measures have been proposed in connection with photocurable resins. For example, Japanese Patent Kokai Publication No. 54206/1987 proposes the use of a resin having a large light absorption coefficient to increase curing properties at a surface, whereby the shrinkage of the resin in the radial direction is suppressed. Japanese Patent Kokai Publication No. 95510/1987 proposes a coated optical fiber having a coating layer made of a resin with a degree of curing shrinkage of 0 (zero).

However, the above prior arts intend to decrease the compressing or expanding force in the radial direction to zero by selecting the special resins. The selection of such resins does not satisfy the requirement for physical properties, particularly high speed curing, of a coating material of the optical fiber.

According to Japanese Patent Kokai Publication No. 95510/1987, since all the disclosed non-shrinkable resins are curable resins based on ring-opening polymerization, they have a very low curing rate in comparison to radical polymerized resins having terminal vinyl groups which are widely used now.

According to Japanese Patent Kokai Publication No. 54240/1987, since most of the irradiated light is absorbed by the resin, the resin may be undercured. In particular, in case of the optical fiber having a large coating thickness, it is impossible to increase productivity. In addition, the measure disclosed in this Publication can be applied only to the photocurable resins but not to the thermosetting resins.

SUMMARY OF THE INVENTION

An object of the present invention is to provide a novel structure of a coated optical fiber, which does not suffer from light transmission loss caused by the compression or expansion force in the radial direction generated by the volume decrease of the coated resin.

This and other objects of the present invention are achieved by an optical fiber comprising a glass optical fiber and a rigid protective layer which is coated directly on the glass fiber wherein a constricting force F generated by the protective layer is from $-0.05$ kg to $+0.05$ kg when the force F is defined by the following equation:

$$F = \text{(Cross sectional area of protective layer)} \times \text{(Young's modulus of protective layer)} \times \text{(Shrinkage factor of inner diameter of protective layer).}$$

When the force F is positive, the protective layer compresses the glass optical fiber inwardly, while when it is negative, the protective layer pulls or expands the glass optical fiber outwardly, thereby the strain is generated in the glass optical fiber. Irrespective of the direction of the force, the force F is referred to as "constricting force".

DETAILED DESCRIPTION OF THE INVENTION

Figure 1:
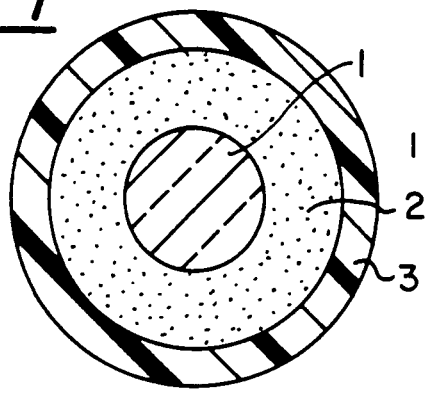
FIG. 1 is a cross-section of an optical fiber having a two layer coating.
Figure 2:
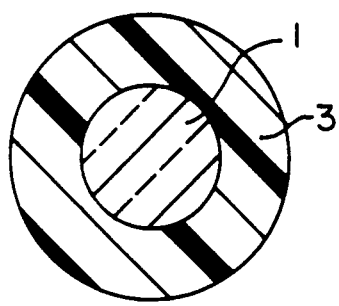
FIG. 2 is a cross-section of an optical fiber having a single protective layer.

Hitherto, it has been expected that the light transmission loss through the coated optical fiber increases as the constricting force by the protective layer increases. However, the constricting force has not been actually measured. The present inventors have examined various manners for measuring the constricting force of the protective layer of the coated optical fiber. As the result, it has been found that, when the glass fiber is removed from the coated optical fiber as shown in FIG. 2, an absolute value of the constricting force can be measured by measuring the direction and degree of change of the inner diameter of the protective layer.

Figure 3A:
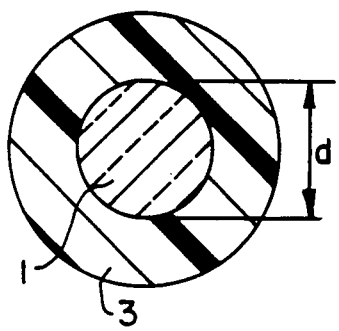
FIGS. 3a and 3b show cross-sections of optical fibers from which the constricting force as described in the present application is determined.
Figure 3B:
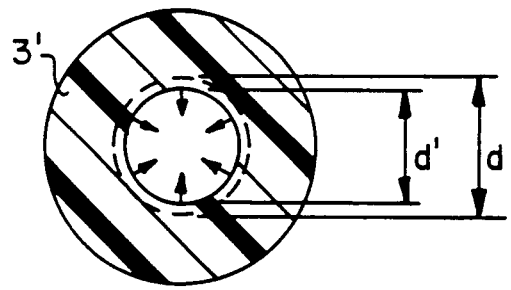

By making reference to FIGS. 3A and 3B, the calculation of the constricting force according to the present invention is explained.

When the glass fiber is still present, the inner diameter of the protective layer 3 is equal to an outer diameter d of the glass fiber 1 (see FIG. 3A). When the glass fiber is removed from the protective layer, the shape of the protective layer is changed to a layer 3' having an inner diameter d' since the constricting force is present in the inward or outward direction (see FIG. 3B).

Then, a shrinkage factor D of the inner diameter of the protective layer is defined by $D=(d-d')/d$. When the protective layer shrinks after removals of the glass fiber, the factor D is positive ($d>d'$), while when the layer expands, the factor D is negative ($d<d'$).

Assuming that the strain in the protective layer after removal of the glass fiber is completely relaxed and the layer shrinks uniformly, the degree of relaxed strain per unit length of the fiber is approximately equal to:

(Shrinkage factor of inner diameter) ×

(Young's modulus of protective layer) ×

(Cross-sectional area of protective layer).

Since all the force generated by the strain in the protective layer is deemed to be applied to the glass fiber, the degree of strain can be deemed to be equal to the constricting force.

In case of the thermosetting resin, the shrinkage factor D is always positive. However, in case of the photocurable resin, since it may shrinks outwardly due to surface curing, the shrinkage factor D may be negative. In general, the factor D is from 0.5 to 3.0% for the thermosetting resins and from $-1.0$ to 4.0% for the photocurable resins.

Figure 4:
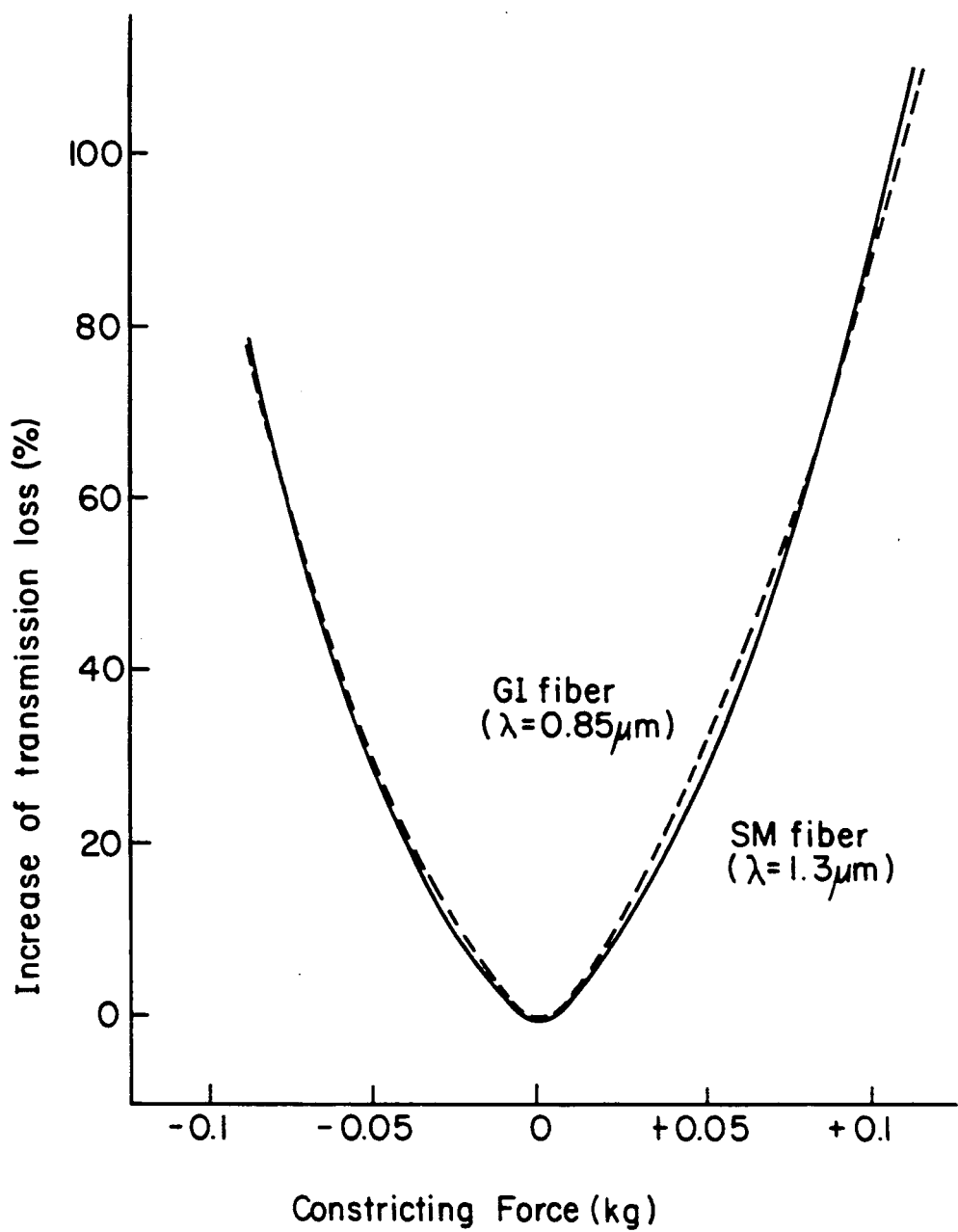
FIG. 4 is a plot of constricting force versus transmission loss for two optical fibers.

Relationships between the calculated constricting force and the light transmission loss of the optical fibers are examined. The results are shown in FIG. 4. The solid and broken curves in FIG. 4 represent the relationships for a SM (single mode) optical fiber and a GI (graded index type) optical fiber, respectively. Each optical fiber was produced by coating the SM or GI optical fiber having a glass diameter of 125 $\mu$m with a resin having Young's modulus of 1 to 250 kg/mm² at a thickness of 130 to 400 $\mu$m. The shrinkage factor of the inner diameter of layer was measured and then the constricting force was calculated as above. Then, the relationship between the light transmission loss and the constricting force was plotted.

The transmission loss was measured by the OTDR method (method for measuring back scattered light) on a bundle of coated optical fibers having a length of 3000 m. The light used in this measurement had a wavelength of 1.3 $\mu$m and 0.85 $\mu$m for the SM optical fiber and the GI optical fiber, respectively. The solid curve in FIG. 4 indicates the increase (%) of transmission loss of the SM optical fiber with the loss of 2.2 dB/km being 100%, and the broken curve in FIG. 4 indicates the increase (%) of transmission loss of the GI optical fiber with the loss of 2.2 dB/km being 100%.

From FIG. 4, it is understood that, when the constricting force is from $-0.05$ to $+0.05$ kg both for the SM and GI optical fibers, the increase of transmission loss does not exceed 30% of that for the standard double coated optical fiber which is less influenced by the constricting force. The above increase of transmission loss of the SM and GI optical fibers is practically acceptable in view of present quality standard for the optical fiber.

When it is desired to lower the increase of transmission loss to $+10\%$ or less as severer quality standard, the constricting force is adjusted in a range between $-0.02$ to $+0.02$ kg.

Standard transmission loss of a SM optical fiber which is not influenced by the constricting force is 0.3 dB/km at a wavelength of 0.85 $\mu$m.

Among the parameters which define the constricting force, the cross sectional area of the protective layer can be controlled by adjusting the amount of resin to be coated, and the shrinkage factor of inner diameter of the protective layer can be controlled by changing a cure shrinkage factor of the resin.

By changing these three parameters one by one and limiting the constricting force in the specific range, the transmission loss can be easily decreased when the rigid protective layer is directly coated on the glass fiber.

Figure 5:
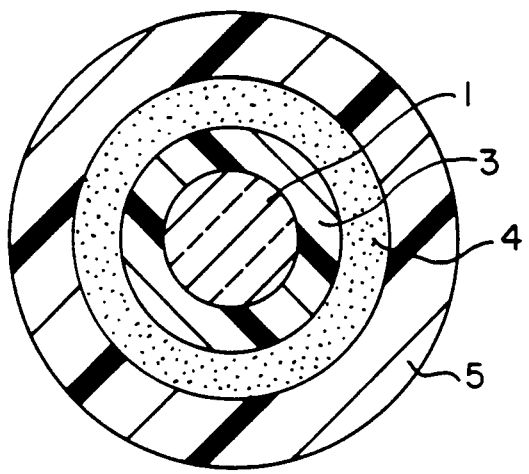
FIG. 5 is a cross-section of an optical fiber having a multilayer coating.

As shown in FIG. 5, the optical fiber having the directly coated protective layer may have a cushioning layer 4 and an additional protective layer 5 to increase edgewise pressure properties. In such optical fiber, the structure of the present invention can be effectively incorporated.

As the resin which forms the protective layer, any of the thermosetting resin and the photocurable resins may be used. Among them, the resin having Young's modulus of at least 1 kg/mm² is preferable, since the effects of the present invention are large with such resin. Specific examples of the resins are UV curable urethane-acrylate resins, UV curable epoxy-acrylate resins, UV curable silicone-acrylate resins, UV curable silicone resins, UV curable polyimide resins, thermosetting silicons resins, thermosetting ladder type silicone resins, thermosetting polyimide resins, etc.

PREFERRED EMBODIMENTS OF THE INVENTION

The present invention will be illustrated by following Examples.

Examples 1-7 and Comparative Examples 1-5

As shown in Table, with using one of the four resins A, B, C and D having different curing types, Young's modulus and the shrinkage factor of inner diameter of the protective layer, a single protective layer was formed with changing the thickness of the layer to change the constricting force on a SM or GI optical fiber having a diameter of 125 $\mu$m, and its transmission loss was measured at room temperature.

The resins A and B were UV curable urethane-acrylate resins comprising an urethane-acrylate base oligomer, a trifunctional monomer and a photopolymerization initiator. The shrinkage factors of the inner diameter of the resins A and B were changed by using photopolymerization initiators having different surface curability.

The resin C was prepared by modifying the resin A by changing the oligomer to an epoxy-acrylate base oligomer with larger rigidity to increase Young's modulus.

The resin D was a thermosetting ladder silicone resin which comprised polysilylsesquioxane and was cured through a dehydration-condensation reaction at molecule terminals.

The glass fiber was coated with the resin by coating the resin with a die and curing it by radiation with a UV lamp in case of the resins A, B and C or with an IR heating oven in case of the resin D.

The transmission loss was measured at a wavelength of 1.3 or 0.85 μm for the SM or GI optical fibers, repectively.

TABLE

| Example No. | Resin | Young's modulus (kg/mm$^2$) | Shrinkage factor of inner diameter (%) | Thickness of protective coating (μm) | Constricting force (kg) | Increase of transmission loss (%) | |
|---|---|---|---|---|---|---|---|
| | | | | | | SM fiber | GI fiber |
| 1 | A | 60 | +1.6 | 180 | +0.012 | +3 | +3 |
| 2 | | | | 240 | +0.031 | +14 | +15 |
| Comp. 1 | | | | 300 | +0.056 | +35 | +40 |
| 3 | B | 60 | −0.8 | 250 | −0.018 | +6 | +7 |
| 4 | | | | 300 | −0.028 | +12 | +13 |
| Comp. 2 | | | | 400 | −0.054 | +32 | +33 |
| 5 | C | 90 | +2.0 | 220 | +0.046 | +25 | +25 |
| Comp. 3 | | | | 240 | +0.059 | +41 | +46 |
| Comp. 4 | | | | 300 | +0.105 | +106 | +100 |
| 6 | D | 250 | +3.0 | 130 | +0.008 | +1 | +1 |
| 7 | | | | 150 | +0.105 | +20 | +23 |
| Comp. 5 | | | | 180 | +0.105 | +90 | +85 |

F = (Cross sectional area of protective layer) × (Young's modulus of the protective layer) × (Shrinkage factor of inner diameter of protective layer).

As understood from the above results, the coated optical fiber with decreased transmission loss can be provided by adjusting the constricting force in the range from −0.05 to +0.05 kg.

What is claimed is:

1. An optical fiber comprising:
   a glass optical fiber; and
   a rigid protective layer coated directly on the glass fiber;
   wherein a constricting force F generated by the protective layer is from −0.05 kg to 0.05 kg where the force F is defined by the following equation:

2. The optical fiber according to claim 1, wherein said constricting force F is from −0.02 to +0.02 kg.

3. The optical fiber according to claim 1, wherein said protective layer is formed from a resin selected from the group consisting of UV curable urethane-acrylate resins, UV curable epoxy-acrylate resins, UV curable silicone-acrylate resins, UV curable silicone resins, UV curable polyimide resins, thermosetting silicone resins, thermosetting ladder type silicone resins and thermosetting polyimide resins.

4. The optical fiber according to claim 1, which is a single mode optical fiber.

5. The optical fiber according to claim 1, which is a graded index type optical fiber.

* * * * *